(12) United States Patent
Tzivanopoulos et al.

(10) Patent No.: US 11,312,415 B2
(45) Date of Patent: Apr. 26, 2022

(54) PARKING ROBOT FOR A TRANSPORTATION VEHICLE WITH AT LEAST TWO AXLES AND METHOD FOR OPERATING A PARKING ROBOT

(71) Applicant: VOLKSWAGEN AKTIENGESELLSCHAFT, Wolfsburg (DE)

(72) Inventors: Theodoros Tzivanopoulos, Wolfsburg (DE); Stephan Herold, Braunschweig (DE); Juan Mauricio Toro Ramos, Braunschweig (DE); Daniel Schütz, Lehre (DE)

(73) Assignee: Volkswagen Aktiengesellschaft

( * ) Notice: Subject to any disclaimer, the term of this patent is extended or adjusted under 35 U.S.C. 154(b) by 314 days.

(21) Appl. No.: 16/703,259

(22) Filed: Dec. 4, 2019

(65) Prior Publication Data

US 2020/0180696 A1 Jun. 11, 2020

(30) Foreign Application Priority Data

Dec. 6, 2018 (DE) ...................... 10 2018 221 169.8

(51) Int. Cl.
*B62D 15/00* (2006.01)
*B62D 15/02* (2006.01)
(Continued)

(52) U.S. Cl.
CPC .......... *B62D 15/0285* (2013.01); *B60S 13/00* (2013.01); *B60W 10/20* (2013.01);
(Continued)

(58) Field of Classification Search
CPC ... B62D 15/0285; B62D 15/021; B60S 13/00; B60W 10/20; B60W 30/06; E04H 6/305; E04H 6/34; E04H 6/36; E04H 6/424
See application file for complete search history.

(56) References Cited

U.S. PATENT DOCUMENTS 9,534,410 B2 1/2017 Shani et al.
9,746,396 B2 8/2017 Seimoto et al.
(Continued)

FOREIGN PATENT DOCUMENTS

CN 102864954 A 1/2013
CN 105307875 A 2/2016
(Continued)

OTHER PUBLICATIONS

Zhongxue et al.; Modern Manufacturing Systems; Xidian University Press; Aug. 2013; pp. 144-145.
(Continued)

*Primary Examiner* — Russell Frejd
*Assistant Examiner* — Brittany Renee Peko
(74) *Attorney, Agent, or Firm* — Barnes & Thornburg LLP (57) ABSTRACT

A parking robot for a transportation vehicle having at least two wheel axles and a method for operating a parking robot. The parking robot includes a main robot part and a secondary robot part which each have a pair of wheel support arms on two opposite sides. The two-part parking robot then moves under the transportation vehicle with respective folded-in wheel support arms and disconnects the secondary robot part from the main robot part to position the main robot part and the secondary robot part each in a region of one of the wheel axles beneath the transportation vehicle and to lift up respective wheels of the respective wheel axle of the transportation vehicle by folding out the respective pairs of wheel support arms.

20 Claims, 2 Drawing Sheets

(51) Int. Cl.
  *E04H 6/42*   (2006.01)
  *B60S 13/00*  (2006.01)
  *E04H 6/34*   (2006.01)
  *B60W 30/06*  (2006.01)
  *E04H 6/30*   (2006.01)
  *B60W 10/20*  (2006.01)
  *E04H 6/36*   (2006.01)

(52) U.S. Cl.
  CPC ........... *B60W 30/06* (2013.01); *B62D 15/021* (2013.01); *E04H 6/305* (2013.01); *E04H 6/34* (2013.01); *E04H 6/36* (2013.01); *E04H 6/424* (2013.01)

(56) References Cited

U.S. PATENT DOCUMENTS

| | | | |
|---|---|---|---|
| 2018/0142488 A1 | 5/2018 | Boussard et al. | |
| 2018/0297505 A1* | 10/2018 | Vladimir | B60P 3/07 |
| 2019/0322205 A1* | 10/2019 | Dombrowski | B60P 3/06 |
| 2020/0269427 A1* | 8/2020 | Shikano | B25J 9/1679 |

FOREIGN PATENT DOCUMENTS

| | | | | |
|---|---|---|---|---|
| CN | 205627766 U | | 10/2016 | |
| CN | 205637766 U | * | 10/2016 | ............ E04H 6/36 |
| CN | 207761382 U | | 8/2018 | |
| CN | 207794736 U | | 8/2018 | |
| DE | 102017223520 A1 | * | 2/2015 | ............ E04H 6/36 |
| DE | 102015203506 A1 | | 9/2016 | |
| DE | 102016208235 A1 | | 11/2017 | |
| DE | 102016224098 A1 | | 6/2018 | |
| EP | 2937261 A2 | | 10/2015 | |
| EP | 3146130 A1 | | 3/2017 | |
| JP | 2008075351 A | | 4/2008 | |
| JP | 2016216936 A | | 12/2016 | |
| KR | 101703651 B1 | | 2/2017 | |
| WO | 2018026347 A1 | | 2/2018 | |

OTHER PUBLICATIONS

Office Action for Chinese Patent Application No. 2019-112408620; dated Nov. 11, 2021.

* cited by examiner

PARKING ROBOT FOR A TRANSPORTATION VEHICLE WITH AT LEAST TWO AXLES AND METHOD FOR OPERATING A PARKING ROBOT

PRIORITY CLAIM

This patent application claims priority to German Patent Application No. 10 2018 221 169.8, filed 6 Dec. 2018, the disclosure of which is incorporated herein by reference in its entirety.

SUMMARY

Illustrative embodiments relate to a parking robot for a transportation vehicle having at least two wheel axles and to a method for operating such a parking robot.

BRIEF DESCRIPTION OF THE DRAWINGS

In the text which follows, an exemplary embodiment is described. In the drawings.

DETAILED DESCRIPTION

A parking robot is usually configured to transport a transportation vehicle within a predefined infrastructure environment, for example, a multistory carpark, to a predefined parking positions. To do this, the parking robot moves, for example, at least partially under the transportation vehicle, lifts it up and subsequently moves with the lifted-up motor transportation vehicle to the predefined parking position at which it sets down the transportation vehicle again. By a parking robot, transportation vehicles can therefore be moved fully autonomously, and therefore without the involvement of a driver of the transportation vehicle, within the infrastructure environment, irrespective of whether or not they have, for example, a driver assistance system for at least partially autonomous parking.

DE 10 2016 224 098 A1 describes an omnidirectional mobile transportation vehicle transportation platform which has at least three Mecanum wheels. With this mobile transportation vehicle transportation platform it is possible to move into the intermediate space between a vehicle floor of a transportation vehicle and an underlying surface and subsequently lift up the transportation vehicle from the underlying surface by a lifting device of the transportation vehicle transportation platform. In this way, the transportation vehicle is lifted off from the underlying surface at least on an axle basis or completely.

WO 2018/026347 A1 describes a parking robot which comprises a lifting rail, a holding device for respective wheels of a vehicle and a lifting motor. The holding device for the respective wheels is arranged on the lifting rail and can be moved from a first position to a second position along the lifting rail. The lifting motor is connected in this context to the lifting rail and moves the holding elements for the respective wheel from the first position to the second position.

Disclosed embodiments make available a solution with which a parking robot which is arranged under a transportation vehicle can overcome ramps and inclines.

The disclosed embodiments are based on the realization that with conventional single-park parking robots which are positioned underneath a transportation vehicle and which lift up, for example, the four wheels of the transportation vehicle it is possible to overcome only small ramps or other small inclines. The reason for this is that parking robots usually have a plate which is near to the ground and touches down with the plate on the ramp so that it cannot overcome the ramp. Therefore, it would, for example, be possible to implement a parking robot which could deal with ramps if the parking robot were in two parts.

The disclosed parking robot for a transportation vehicle having at least two wheel axles comprises a main robot part and a secondary robot part. The disclosed parking robot for a transportation vehicle is therefore in two parts. The main robot part and the secondary robot part each have a pair of wheel support arms on two opposite sides in each case. These wheel supports arms are provided here as foldable components, that is to say components which can be folded out or in and of which both the main robot part and the secondary robot part each have a total of four pieces, that is to say two respective pairs of wheel support arms. When the wheel support arms are folded in, they are each oriented parallel to a longitudinal direction of the parking robot and are therefore folded against the respective robot part.

The parking robot is then configured to move under the transportation vehicle with respective folded-in wheel support arms. The parking robot in its entirety, that is to say with the main robot part and the secondary robot part connected, is therefore configured to move into the intermediate space between a transportation vehicle floor of the transportation vehicle and an underlying surface on which the transportation vehicle is, for example, currently positioned. The transportation vehicle is configured to disconnect the secondary robot part from the main robot part there. As soon as the parking robot has moved under the transportation vehicle as far as a predefined target position underneath the transportation vehicle, it therefore splits into two parts, into the main robot part and into the secondary robot part.

The parking robot is also configured to position the main robot part and the secondary robot part each in a region of one of the wheel axles of the transportation vehicle underneath the transportation vehicle. If, for example, the parking robot approaches the transportation vehicle from the rear, the parking robot would firstly position itself underneath the transportation vehicle in such a way that the main robot part comes to be positioned in the region of the rear wheel axle of the transportation vehicle. The secondary robot part which is disconnected from the main robot part will therefore then move away from the main robot part until it has reached the region of the front axles of the transportation vehicle and will position itself there. This positioning of the main robot part and of the secondary robot part may occur centrally underneath the transportation vehicle here, that is to say with an approximately equal distance from the two respective wheels of the respective wheel axle.

The parking robot is then configured to lift up respective wheels of the respective wheel axle of the transportation vehicle by folding out the respective pairs of wheel support arms. When respective wheel support arms are folded out, they are therefore located in a position of use of the respective wheel support arms. To lift up the wheels of the transportation vehicle, for example, the wheel support arms are folded out from their folded-in position until they each touch the lateral surface of the respective wheel on two opposite sides and press against the respective wheel from both sides by further folding out, and finally lift up the respective wheel of the transportation vehicle. During the folding out of the respective wheel support arms, respective wheels are therefore ultimately pressed upward in a vertical direction of the transportation vehicle so that when the respective wheel support arms are at an angle which is typically 90° with respect to the external wall of the main robot part or of the secondary robot part, they have lifted up the transportation vehicle completely from the underlying surface.

This lifting up by the main robot part and the lifting up by the secondary robot part can typically occur successively. For example, the parking robot is firstly positioned in its entirety, for example, in the region of the rear axle of the transportation vehicle. Then, the respective wheel support arms of the main robot part are folded out so that the respective rear wheels of the transportation vehicle are lifted up. Then, the secondary robot part disconnects from the main robot part and moves autonomously to the region of the front axle of the transportation vehicle. As soon as it is positioned there, the secondary robot part also folds out its respective wheel support arms so that the transportation vehicle is also lifted up in the region of the front wheels. With such a parking robot it is then also possible to overcome ramps or other inclines. This is useful if the parking robot is to be used to transport a transportation vehicle from a parking level of a multistory carpark to a parking space in another parking level of the multistory carpark. The parking robot is also suitable for overcoming relatively small potholes and ridges in the underlying surface which also can be overcome without difficulty with the respective two-part parking robot without, for example, the parking robot which is arranged underneath the transportation vehicle touching down, for example, at the edge of a pothole. Furthermore, with the two-part parking robot it is possible to implement a robot which is implemented both for picking up a transportation vehicle, conveying it from a starting position to a predefined target position and for setting it down at the target position and which can lift up, transport and set down the transportation vehicle autonomously.

In at least one disclosed embodiment there is provision that in a flat partial region in which the respective pair of wheel support arms is arranged on two opposite sides, the main robot part has a flat surface and is movably mounted on at least one roller. The region of the main robot at which ultimately the two wheels of one of the wheel axles of the transportation vehicle are supported therefore has a flat design without elevated portions and/or depressions so that it is made possible for the distance between an underlying surface on which the main robot part is positioned and the transportation vehicle floor which is lifted off from the main robot part to be particularly small. The size of this distance is in fact determined by a diameter of the at least one roller of the main robot part and a thickness of the flat partial region in the vertical direction of the robot. It is therefore made possible for the main robot part to be seated closely on the transportation vehicle and as a result approximately equally steep ramps can be overcome with the parking robot and with the transportation vehicle which is lifted up by the parking robot line those which can be overcome by the transportation vehicle without a parking robot arranged underneath it. To stabilize the flat partial region of the main robot part, it is additionally mounted on at least one roller, that is to say for example, on a wheel. In this context, the flat partial region may be movably mounted on two rollers which are arranged on the two opposite sides on which in each case a pair of wheel support arms is arranged, as a result of which this partial region becomes stable.

In at least one exemplary embodiment of the disclosed parking robot there is provision that the main robot part has a raised partial region which comprises an electric main drive machine, a battery for supplying the electric main drive machine with electrical energy and at least one drive wheel for propelling the main robot part and the secondary robot part connected to the main robot part. The raised partial region may be arranged directly next to the flat partial region with the respective wheel support arms here. The raised partial region comprises all the components which are necessary for a drive and therefore for locomotion, that is to say for movement, of the main robot part. The main drive machine, the battery and the at least one drivewheel of the main robot part are configured to drive either the main robot part alone or to drive the entire parking robot, that is to say the main robot part with the connected secondary robot part. The battery is configured here in such a way that the main robot part is part of the parking robot which either pushes the transportation vehicle from behind lifted up by the main robot part and the secondary robot part, to the desired target position or, if it is arranged, for example, in the region of the front axle of the transportation vehicle, is configured to pull the transportation vehicle, lifted up by the main robot part and the secondary robot part, to the target position. A major part of the power which is provided to the parking robot may be made available by the battery for supplying the electric main drive machine with electrical energy. The locomotion of the main robot part or of the entire parking robot occurs here, for example, by two drive wheels which are arranged, for example, underneath the raised partial region, wherein the main robot part additionally has the at least one roller which is arranged underneath the flat partial region of the main robot part.

In addition, the raised partial region of the main robot part has a communication interface which is designed for a communication link to the disconnected secondary robot part. This communication link to the disconnected secondary robot part can be embodied, for example, as wireless radio link. Alternatively, an optical communication link can be established between the main robot part and the secondary robot part via corresponding communication interfaces, that is to say the communication link is implemented, for example, using organic light-emitting diodes (OLED). With such an optical communication link high data rates can be achieved, but they can only be exchanged between the robot parts which are arranged on the respective wheel axles of the transportation vehicle, that is to say the main robot part and the secondary robot part. As a result, there is, for example, no electromagnetic interference radiation which affects functioning of other electrical devices in the surroundings of the parking robot. In addition, such a communication link is less susceptible to manipulation, such as for example, manipulation by a successful hacker attack on the corresponding communication link, in comparison to a radio link, such as, for example, a WLAN link. The raised partial region of the main robot part therefore comprises drive components which are important for the operation of the parking robot, ultimately to be able to overcome, for example, ramps or other gradients with the main robot part.

In a further disclosed embodiment there is provision that the raised partial region of the main robot part comprises a sensor device which is designed to sense the surroundings of the parking robot. The sensor device comprises, for example, a camera device, a radar device, an ultrasonic device, a laser scanner or a lidar device. With this sensor device it is possible to pick up data from the direct surroundings of the raised part of the main robot part so that, for example, the surroundings of the parking robot can be measured with the sensor device. The sensor device is also designed to determine the location of obstacles for the parking robot with the lifted-up transportation vehicle in the sensed surroundings. If, for example, the parking robot is located with the lifted-up transportation vehicle in a multistory carpark which has a plurality of columns, the sensor device can sense these columns, which constitute obstacles for the parking robot with the lifted-up transportation vehicle, in the sensed surroundings and place the columns, for example, relative to a current position of the parking robot, for example, in the data of the cameras of the main robot part. By using the sensor device it is therefore possible to detect, on the one hand, obstacles which are permanently located in the surroundings. Alternatively or additionally, it is, however, possible to sense variable obstacles, such as, for example, moving persons or mobile objects, such as, for example, other transportation vehicles or parking robots, to determine their position and to determine their location in the surroundings. In this context, in particular relative positions with respect to the parking robot are determined so that the parking robot is provided with detailed information on the surroundings of the parking robot with the lifted-up transportation vehicle. This makes it possible for the two-part parking robot always to be provided with current information on its surroundings, which information can subsequently be evaluated by the robot, if appropriate, for planning movement trajectories or for an emergency stop. The parking robot can also be implemented cost-effectively, since only the main robot part requires a complex sensor device.

In a further disclosed embodiment there is provision that the raised partial region of the main robot part comprises a control device which is configured to determine a respective travel trajectory for the main robot part and the secondary robot part with a predefined target position. In this context, map data which is provided by the control device, the sensed surroundings of the transportation vehicle and the obstacles whose location has been determined are taken into account. The map data which is provided can be provided, for example, by an external server device, such as, for example, an infrastructure device of the corresponding infrastructure, such as, for example, of a multistory carpark, by a communication link between this server device and the communication interface of the main robot part of the control device. Alternatively or additionally to this, the control device can access map data which is stored in the raised partial region of the main robot part, for example, in a memory unit of the main robot part. This map data contains, for example, information about known particular features of the infrastructure, such as, for example, the positions of columns within the multistory carpark or the coordinates and positions of individual parking spaces within the multistory carpark. The map data which is provided is useful when determining the travel trajectory, and therefore the control device, taking into account the predefined target position, which is, for example, also provided by the external server device, can calculate an optimum route, that is to say, for example, the shortest possible travel trajectory to this target position.

The surroundings of the parking robot which are sensed previously by the sensor device and the obstacles whose location is determined in the surroundings are also taken into account during the determination of the respective travel trajectory. This makes possible autonomous control of the parking robot with the lifted-up transportation vehicle, for example, by the multistory carpark. By taking into account the sensed surroundings and the obstacles whose location has been determined it is additionally possible to take into account temporarily present obstacles, for example, persons walking within the multistory carpark or other traveling transportation vehicles, in the determination of the travel trajectory, so that the parking robot can, for example, give these obstacles a large berth and drive around or avoid them at an early point. In addition, on the basis of the sensed surroundings it can be known, for example, to the control device that relatively small potholes or ridges are located in the underlying surface, so that these are, if appropriate, taken into account in the determination of the travel trajectory and/or corresponding parameters for the drive of the parking robot which supports the transportation vehicle. Overall, this makes it possible to actuate the autonomously moving two-part parking robot in such a way that it can move on an optimum travel trajectory to its predefined target position. This makes it possible to convey the transportation vehicle with the parking robot in a particularly beneficial way.

In at least one disclosed embodiment there is provision that the control device is configured to actuate the main robot part in accordance with the travel trajectory for the main robot part by the electric main drive machine. The control device is therefore configured also to actually actuate the main robot part on the basis of the travel trajectory which has been previously determined by it for the main robot part, that is to say to actuate the electric main drive machine in such a way that the latter moves, with its at least one drive wheel for propelling the main robot part, the main robot along its travel trajectory. If the main robot part and the secondary robot part have not yet been disconnected from one another, the entire parking robot can be actuated by the control device by the electric main drive machine in accordance with the travel trajectory determined by the control device.

The control device is also configured to make available the travel trajectory for the secondary robot part to the secondary robot part via the communication link. The secondary robot part therefore does not have a separate control device for planning the travel trajectory. The secondary robot part can therefore be of simple design and does not require a separate sensor device for sensing the surroundings of the parking robot. Corresponding actuation commands can be transmitted to the secondary robot part via the communication link between the main robot part and the secondary robot part. These actuation commands can, for example, also contain information as to how far the secondary robot must move away from the main robot part when it is disconnected from the main robot, to position itself in the region of the other wheel axle of the transportation vehicle, to lift up the wheels thereof by folding out its wheel support arms. An intelligent, autonomously controlled, two-part parking robot can therefore be implemented with the control device in the main robot part.

A further disclosed embodiment provides that the secondary robot part has a flat surface which is mounted on at least one roller which can be actuated. The second robot part is therefore embodied completely as a component with a flat design. The secondary robot part, which also has two pairs of wheel support arms on two opposite sides, can be movably mounted here on, for example, two rollers which can be actuated and which are each arranged on the two opposite sides. The secondary robot part additionally comprises an electric secondary drive machine which is supplied with electrical energy by a battery and is at least configured to move the secondary robot part from the main robot part as far as one of the wheel axles of the transportation vehicle and back again to the main robot part. The secondary robot part therefore does not have to be configured to contribute at least part of the drive power of the parking robot within the scope of the transportation of the transportation vehicle with the parking robot. This is because the electric secondary drive machine merely has to be configured to move as far as the desired position in the region of one of the wheel axles underneath the transportation vehicle, before the lifting up of the transportation vehicle after the disconnection from the main robot part, and conversely thereto to move back again to the main robot part when the transportation vehicle is set down. The secondary robot part is therefore moved together with the main robot part as a single-part parking robot, for example, to a next transportation vehicle which is also to be transported by the parking robot. In addition, the secondary robot part comprises a communication interface for a communication link to the main robot part.

The electric secondary drive machine is supplied with electrical energy with the battery for supplying the electric secondary drive machine with electrical energy, the battery also being included in the secondary robot part. The battery for supplying the electric secondary drive machine with electrical energy can therefore have a lower maximum charge in comparison with the battery for supplying the electric main drive machine with electrical energy of the main robot part. While the transportation vehicle is being transported with the parking robot, specifically any drive power is made available by the main drive machine of the raised partial region of the main robot part. The secondary robot part, which is also mounted on rollers, merely has to adopt the movement of the parking robot in terms of its direction of travel, for example, by correspondingly actuating the at least one roller of the secondary robot part which can be actuated. As a result, it is possible that there are not two completely equipped robot parts so that the parking robot can lift up and transport the transportation vehicle and set it down again. This is because instead just one robot part, the main robot part, is necessary, which part has the control device, the sensor device and the main drive machine and the battery for supplying this electric main drive machine with electrical energy as well as the at least one drive wheel for moving the parking robot. The parking robot can therefore be implemented in a cost-effective way, since it is not necessary for each robot part to have the same costly component equipment level.

In a further disclosed embodiment there is provision that the respective wheel support arms have respective sliding rollers which, in a folded-out position of the respective wheel support arms, are arranged in a longitudinal direction of the respective sliding rollers, parallel to the wheel axles of the transportation vehicle. In a folded-out position after the lifting up of the wheel of the transportation vehicle, the respective rotational axis of the respective sliding roller is therefore arranged parallel to the wheel axle of the transportation vehicle. By pressing the wheel support arms against the respective wheel of the transportation vehicle as they fold out, the respective wheel can slide on the sliding rollers wherein ultimately when the respective wheel support arms have reached their end position in which they are located parallel to the wheel axis of the transportation vehicle the wheel is lifted off from the transportation vehicle floor. The respective sliding rollers are therefore configured as passive rollers which are always rotatable. As a result of the pressing of the respective wheel support arms on both sides against the respective wheel it is ensured that when the transportation vehicle is lifted up and, if appropriate, set down, the transportation vehicle does not roll away and in addition the lifting up and the setting down are efficient in terms of required energy for the lifting up or setting down of the transportation vehicle.

The disclosed embodiments also relate to a method for operating a parking robot according to one of the preceding claims, in which method the transportation vehicle is raised by the parking robot. The exemplary embodiments which are presented in conjunction with the disclosed parking robot and the benefits thereof apply correspondingly, insofar as they can be applied, to the disclosed method for operating the parking robot. The method for operating a parking robot comprises the following operations: moving under the transportation vehicle with respective wheel support arms of the parking robot folded in, disconnecting the secondary robot part from the main robot part there, positioning of the main robot part and of the secondary robot part each in a region of one of the wheel axles underneath the transportation vehicle and lifting up of respective wheels of the respective wheel axle of the transportation vehicle by folding out the respective pairs of support arms. There is provision here that firstly by folding out its pairs of wheel support arms the main robot part lifts up the one wheel axle of the transportation vehicle, and with a chronological offset, the secondary robot is disconnected from the main robot part and is moved to the other wheel axle of the transportation vehicle, the main robot part folds out its respective wheel support arms and therefore also the wheels of the other wheel axle of the transportation vehicle are lifted up. Alternatively to this it is also possible that firstly both robot parts, that is to say the main robot part and the secondary robot part, are positioned at their respective desired positions underneath the transportation vehicle and then, for example, simultaneously lift up all four wheels of the two wheel axles of the transportation vehicle, for example, simultaneously by folding out the respective pairs of wheel support arms.

In at least one exemplary embodiment of the disclosed method there is provision that a respective travel trajectory for the main robot part and the secondary robot part to a predefined target position is determined by the control device of the main robot part, the travel trajectory for the secondary robot part is made available to the secondary robot part via the communication link; and the main robot part and the secondary robot part which support the lifted-up transportation vehicle move to the predefined target position in accordance with the respective travel trajectory and set the transportation vehicle down at the target position. After the transportation vehicle has been lifted up, respective travel trajectories are determined, for example, on the basis of the data, provided by the sensor device relating to the sensed surroundings and the obstacles whose position has been determined in the surroundings, and taking into account the provided map data on the surroundings for both robot parts, which travel trajectories are then traveled along by the respective robot parts. It is therefore possible that, the lifted-up transportation vehicle is transported, for example, from a starting position in a ground floor of a multistory carpark, with the parking robot to a target position in an upper story of the multistory carpark. The transportation vehicle is set down there at the desired parking position. The parking robot can then move back again into the ground floor of the multistory carpark and can, for example, lift up and transport a second transportation vehicle there, and set it down at a further desired parking position. The parking robot can therefore transport transportation vehicles in various stories of an infrastructure device such as a multistory carpark, which is made possible by virtue of the fact that the two-part parking robot can deal with ramps.

The exemplary embodiments also include developments of the disclosed method which have features as have already been described in conjunction with the developments of the disclosed parking robot. For this reason, the corresponding developments of the disclosed method will not be described once more here.

The disclosed embodiments also include the control device of the main robot part. This control device has a processor device which is configured to actuate the parking robot. The processor device can have for this purpose at least one microprocessor or at least one microcontroller. Furthermore, the processor device can have a program code which is configured to carry out the reception, conveyance and setting down of the transportation vehicle by the corresponding actuation of the parking robot. The program code can be stored in a data memory of the processor device of the control device.

In the exemplary embodiment, the described components of the embodiment each represent individual features which are to be considered independently of one another and which each also develop the disclosed embodiments independently of one another. For this reason, the disclosure is to also comprise combinations of features of the embodiments other than those illustrated in the exemplary embodiment. Furthermore, the described embodiment can also be supplemented by further features of the disclosure already described.

Functionally identical elements are each provided with the same reference symbols in the figures.

Figure 1:
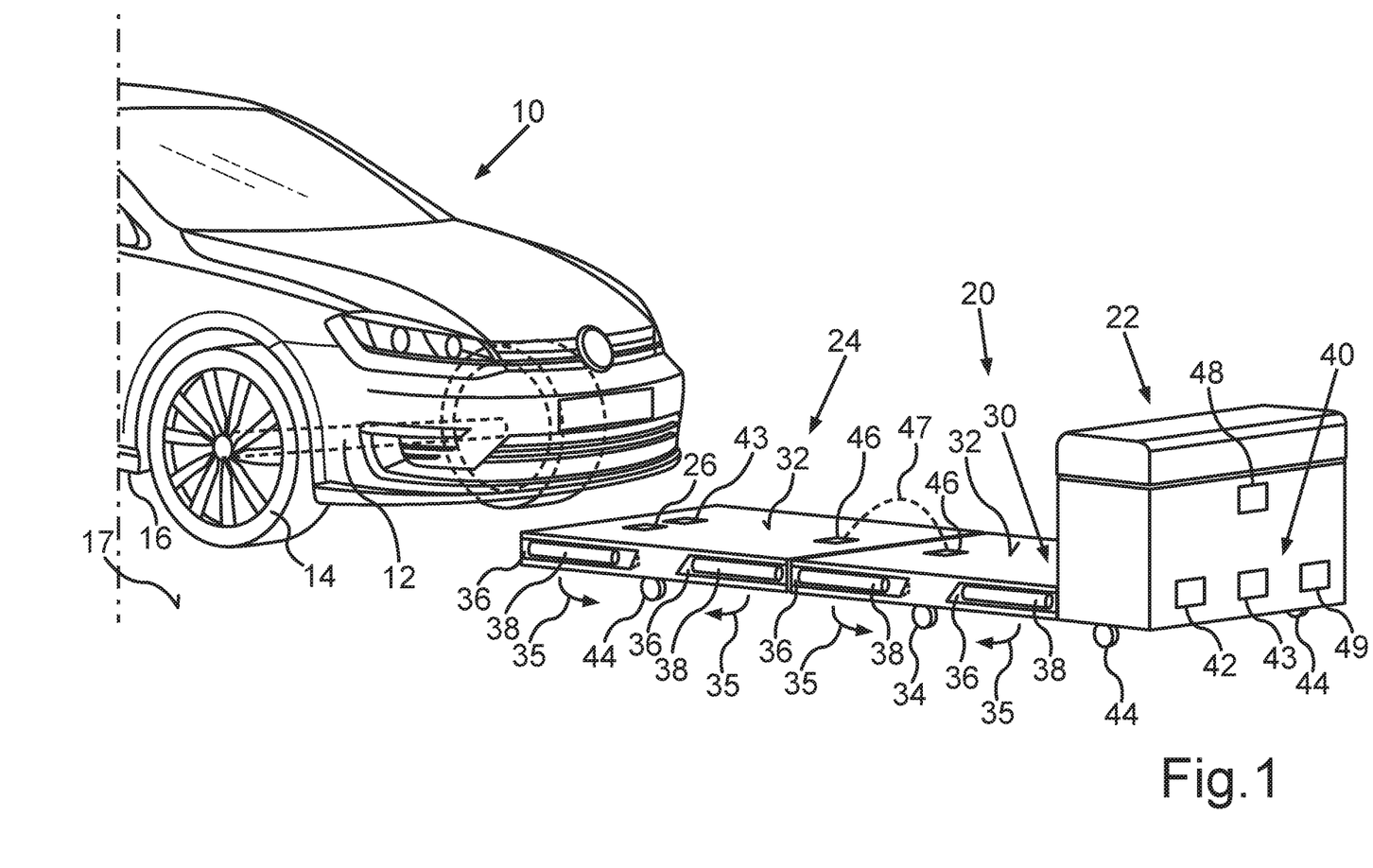
FIG. 1 shows a schematic illustration of a parking robot which is approaching a transportation vehicle.

FIG. 1 is a sketch of a transportation vehicle 10 which comprises at least two wheel axles 12 and a total of four wheels 14. A parking robot 20 is approaching this transportation vehicle 10 from the rear. The parking robot 20 comprises a main robot part 22 and a secondary robot part 24. The main robot part 22 and the secondary robot part 24 each have a pair of wheel support arms 36 respectively on two opposite sides. These wheel support arms 36 are sketched folded in in FIG. 1, that is to say a longitudinal direction of the respective wheel support arms 36 runs parallel to the respective sides of the main robot part 22 and of the secondary robot part 24 and is therefore arranged perpendicularly with respect to the wheel axles 12 of the transportation vehicle 10 when the main robot part 22 and the secondary robot part 24 position themselves underneath the transportation vehicle 10. The respective wheel support arms 36 also have sliding rollers 38. The respective folding devices 35 of the respective wheel support arms 36 are indicated by arrows.

The main robot part 22 has a flat partial region 30 in which the respective pair of wheel support arms 36 is arranged on the two opposite sides. In this flat partial region 30, the main robot part 22 has a flat surface 32 and is mounted so as to be movable on at least one roller 34.

The main robot part 22 also has a raised partial region 40. This raised partial region 40 has an electric main drive machine 42, battery 43 for supplying the electric main drive machine 42 with electrical energy and at least two drive wheels 44 for moving the main robot part 22 and the secondary robot part 24 which is connected to the main robot part 22. The raised partial region 40 of the main robot part 22 furthermore has a communication interface 46 for a communication link 47 to a communication interface 46 of the secondary robot part 24, a sensor device 48 and a control device 49.

The sensor device 48 is, for example, a camera, a wheel device, an ultrasonic device, a laser scanner or a lidar device. The surroundings of the parking robot 20 are sensed with the sensor device 48. In addition, the location of obstacles for the parking robot 20 in the sensed surroundings can be determined by the control device 49.

The control device 49 is configured to determine the respective travel trajectory for the main robot part 22 and the secondary robot part 24 to a predefined target position. In this context, the control device 49 takes into account map data which is provided to the control device 49, the sensed surroundings and the obstacles whose location has been determined. The control device 49 is also configured to provide the travel trajectory, determined in this way, for the secondary robot part 24 to the secondary robot part 24 via the communication link 47, and to actuate the electric main drive machine 42 of the main robot part 22 in accordance with the travel trajectory for the main robot part 22.

The secondary robot part 24 has, like the flat partial region 30 of the main robot part 22, a flat surface 32. This flat surface 32 is mounted on at least one roller 34 which can be actuated. The secondary robot part 24 also has an electric secondary drive machine 26, a battery 43 for supplying the electric secondary drive machine 26 with electrical energy and a communication interface 46 for the communication link 47 to the main robot part 22.

The parking robot 20 is configured to move with the respective wheel support arms 36 folded in under the transportation vehicle 10. The parking robot 20 is therefore moved into the intermediate space between a transportation vehicle floor 16 of the transportation vehicle 10 and an underlying surface 17. In this context, the parking robot 20 may be moved under the transportation vehicle 10 until the main robot part 22 is positioned in the region of the rear wheel axle 12 of the transportation vehicle 10. The secondary robot part 24 is disconnected there from the main robot part 22, and the secondary robot part 24 is moved, driven by the electric secondary drive machine 26, to the front wheel axle 12 of the transportation vehicle 10. Then, for example, firstly the respective wheels 14 of the rear wheel axle 12 of the transportation vehicle 10 are lifted up by folding out the respective wheel support arms 36 of the main robot part 22. Shortly after this, or if appropriate at the same time, the wheels 14 of the other wheel axle 12 of the transportation vehicle 10 are also lifted up by folding out the respective wheel support arms 36 of the secondary robot part 24.

Figure 2:
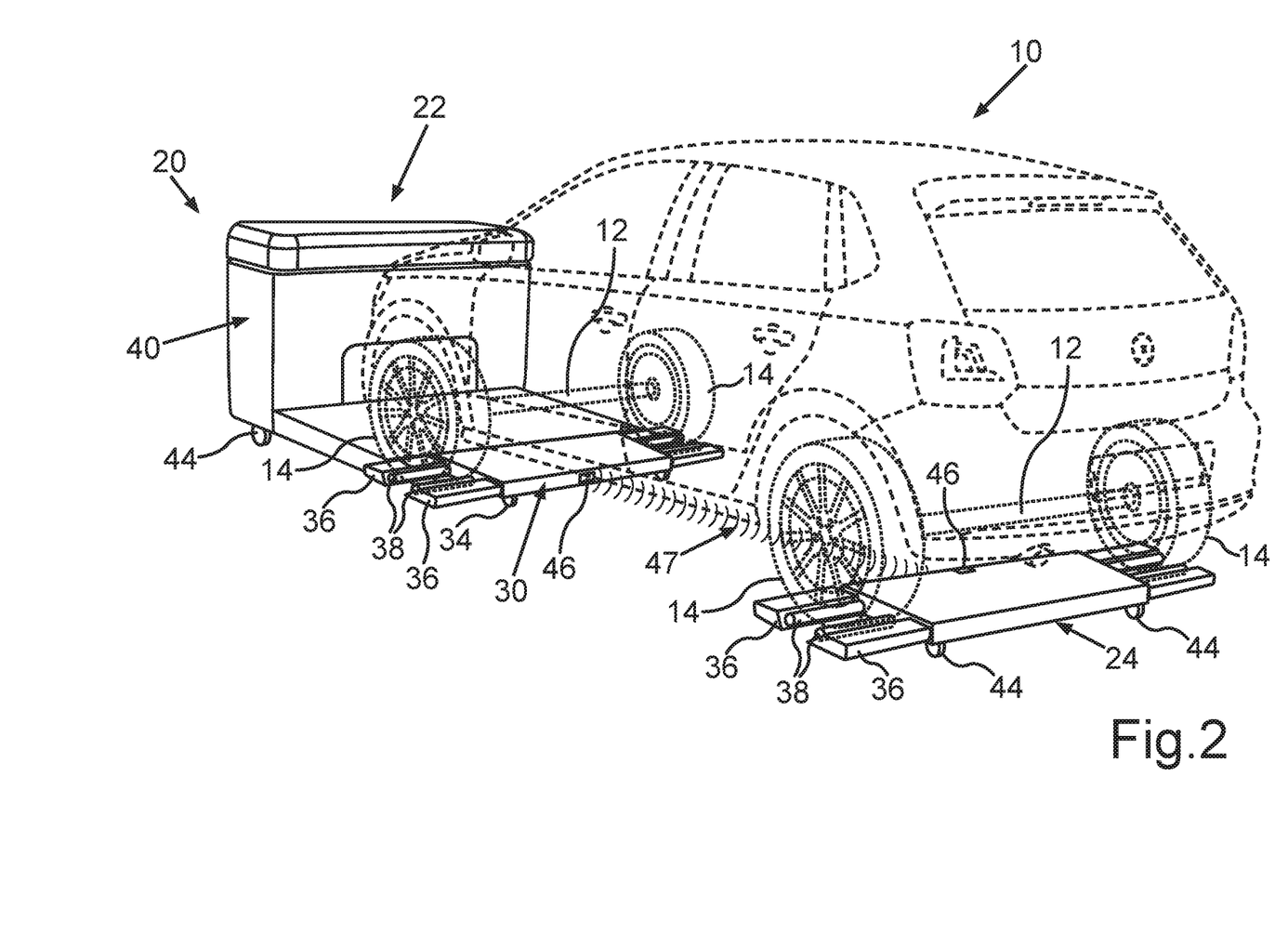
FIG. 2 shows a schematic illustration of a parking robot which is positioned with a main robot part and a secondary robot part under two respective axles of a transportation vehicle.

FIG. 2 is a sketch of the transportation vehicle 10 which is lifted up by the two-part parking robot 20. Here, the communication link 47 is provided between the corresponding communication interface 46 of the secondary robot part 24 and of the main robot part 22 by an optical communication link 47. Alternatively to this, a communication link 47 can be provided by a radio link between these two parts, that is to say between the main robot part 22 and the secondary robot part 24, as shown in the sketch in FIG. 1.

Then, after the transportation vehicle 10 has been lifted up, the control device 49 determines the respective travel trajectories for the main robot part 22 and the secondary robot 24 to the predefined target position. This target position is located, for example, on another parking deck within a multistory carpark. The map data which is required for this can be transmitted to the control device 49 by a multistory carpark device via a corresponding communication link 47 between the multistory carpark control device and the control device 49 of the main robot part 22. The travel trajectories for the secondary robot part 24 are then provided to the secondary robot part 24 via the communication link 47.

The main robot part 22 and the secondary robot part 24, which support the lifted-up transportation vehicle 10, then travel to the predefined position in accordance with the respective travel trajectory, and set the transportation vehicle 10 down there again, to set down the transportation vehicle 10, the wheel support arms 36 are folded in again, as a result of which the transportation vehicle 10 is set down again on the underlying surface 17. The secondary robot part 24 then moves back to the main robot part 22 and the parking robot 20 which is now again in a single part moves out from under the transportation vehicle 10 again.

Overall, the examples show how with the two-part parking robot 20 with little expenditure, since only the main robot part 22 comprises the main drive machine 42 which is absolutely required for actuating the parking robot 20, the battery 43, the drive wheel 44, the sensor device 48 and the control device 49. The secondary robot part 24 is consequently embodied as a relatively simple additional component, as a result of which the entire parking robot 20 becomes cost-effective, wherein it is perfectly able to overcome those ramps and inclines which the transportation vehicle 10 could also overcome when it is not being carried by a parking robot 20. By this interplay between the sensor device 48 and the control device 49 it is additionally possible to overcome or travel around obstacles such as ridges and small potholes but also moving persons or other transportation vehicles in the surroundings of the transportation vehicle 10 with the parking robot 20. The main robot part 22 therefore functions here as a type of leading robot, and the secondary robot part 24 functions as a following robot which follows this leading robot.

LIST OF REFERENCE NUMBERS

10 Transportation vehicle
12 Wheel axle
14 Wheel
16 Transportation vehicle floor
17 Underlying surface
20 Parking robot
22 Main robot part
24 Secondary robot part
26 Secondary drive machine
30 Flat partial region
32 Surface
34 Roller
35 Folding direction
36 Wheel support arm
38 Sliding roller
40 Raised partial region
42 Main drive machine
43 Battery
44 Drive wheel
46 Communication interface
47 Communication link
48 Sensor device
49 Control device

The invention claimed is:

1. A parking robot for a transportation vehicle having at least two wheel axles, wherein the parking robot comprises:
 a main robot part; and
 a secondary robot part,
 wherein the main robot part includes a sensor device configured and positioned to sense the surroundings of the parking robot and determine the location of obstacles for the parking robot with the lifted-up transportation vehicle in the sensed surroundings, and a control device configured to determine respective travel trajectories for both the main robot part and the secondary robot part,
 wherein a first side of the secondary robot part is initially attached to a first side of the main robot part, wherein the secondary robot part is controlled based on the travel trajectory determined by the main robot part,
 wherein the main robot and the secondary robot each have a pair of wheel support arms on two opposite sides, and
 wherein the main robot part and the secondary robot part are controlled and configured to move under the transportation vehicle while the secondary robot part is attached to the main robot part with the wheel support arms being completely folded-in and is further configured to disconnect the secondary robot part from the main robot part after the main robot part and the secondary robot part are moved into a position under the transportation vehicle so as to position the main robot part and the secondary robot part each in a region of one of the wheel axles beneath the transportation vehicle and to lift up respective wheels of the respective wheel axle of the transportation vehicle by folding out the respective pairs of wheel support arms.

2. The parking robot of claim 1, wherein, in a flat partial region in which the respective pair of wheel support arms is arranged on two opposite sides, the main robot part has a flat surface and is movably mounted on at least one roller.

3. The parking robot of claim 1, wherein the main robot part has a raised partial region which comprises an electric main drive machine, a battery for supplying the electric main drive machine with electrical energy and at least one drive wheel for propelling the main robot part and the secondary robot part connected to the main robot part, and a communication interface for a communication link to the disconnected secondary robot part.

4. The parking robot of claim 3, wherein the raised partial region of the main robot part comprises the sensor device.

5. The parking robot of claim 4, wherein the raised partial region of the main robot part comprises the control device, the control device configured to determine the respective travel trajectory for the main robot part and the secondary robot part to a predefined target position taking into account map data which is made available by the control device, the sensed transportation vehicle surroundings and the obstacles whose location has been determined.

6. The parking robot of claim 5, wherein the control device actuates the main robot part in accordance with the travel trajectory for the main robot part by the electric main drive machine and makes available the travel trajectory for the secondary robot part to the secondary robot part via the communication link.

7. The parking robot of claim 1, wherein the secondary robot part has a flat surface mounted on at least one roller which is actuated, and an electric secondary drive machine configured at least to move the secondary robot part from the main robot part as far as one of the wheel axles of the transportation vehicle and back again to the main robot part, a battery for supplying the electric secondary drive machine with electrical energy, and a communication interface for a communication link to the main robot part.

8. The parking robot of claim 1, wherein the respective wheel support arms have respective sliding rollers which, in a folded-out position of the respective wheel support arms, are arranged in a longitudinal direction of the respective sliding rollers, parallel to the wheel axles of the transportation vehicle.

9. A method for operating a parking robot in which the transportation vehicle is raised by the parking robot, the method comprising:
- providing a main robot part including a sensor device configured and positioned to sense the surroundings of the parking robot and determine the location of obstacles for the parking robot with the lifted-up transportation vehicle in the sensed surroundings, and a control device to determine respective travel trajectories for both the main robot part and the secondary robot part;
- attaching the secondary robot part to the main robot part, wherein the main robot and the secondary robot each have a pair of wheel support arms on two opposite sides, wherein the secondary robot part is controlled based on the travel trajectory determined by the main robot part;
- moving the main robot part and the secondary robot part under the transportation vehicle while the secondary robot part is attached to the main robot part with the wheel support arms completely folded in;
- disconnecting the secondary robot part from the main robot part after the main robot part and the secondary robot part are moved into a position under the transportation vehicle;
- positioning the main robot part and the secondary robot part each in a region of one of the wheel axles beneath the transportation vehicle; and
- lifting up respective wheels of the respective wheel axle of the transportation vehicle by folding out the respective pairs of the wheel support arms.

10. The method of claim 9, further comprising:
- determining a respective travel trajectory for the main robot part and the secondary robot part to a predefined target position by a control device of the main robot part;
- making the travel trajectory for the secondary robot part to the secondary robot part via the communication link; and
- moving the main robot part and the secondary robot part which support the lifted-up transportation vehicles to the predefined target position in accordance with the respective travel trajectory and setting the transportation vehicle down at the target position.

11. The method of claim 9, wherein, in a flat partial region in which the respective pair of wheel support arms is arranged on two opposite sides, the main robot part has a flat surface and is movably mounted on at least one roller.

12. The method of claim 9, wherein the main robot part has a raised partial region which comprises an electric main drive machine, a battery for supplying the electric main drive machine with electrical energy and at least one drive wheel for propelling the main robot part and the secondary robot part connected to the main robot part, and a communication interface for a communication link to the disconnected secondary robot part.

13. The method of claim 12, further comprising:
- sensing the surroundings of the parking robot via the sensor device of the raised partial region of the main robot part; and
- determining the location of obstacles for the parking robot with the lifted-up transportation vehicle in the sensed surroundings via the sensor device.

14. The method of claim 13, further comprising:
- determining a respective travel trajectory for the main robot part and the secondary robot part to a predefined target position via the control device of the raised partial region of the main robot part, taking into account map data which is made available by the control device, the sensed transportation vehicle surroundings and the obstacles whose location has been determined.

15. The method of claim 14, further comprising:
- actuating the main robot part via the control device in accordance with the travel trajectory for the main robot part by the electric main drive machine and making available the travel trajectory for the secondary robot part to the secondary robot part via the communication link.

16. The method of claim 1, wherein the secondary robot part has a flat surface mounted on at least one roller which is actuated, and an electric secondary drive machine configured at least to move the secondary robot part from the main robot part as far as one of the wheel axles of the transportation vehicle and back again to the main robot part, a battery for supplying the electric secondary drive machine with electrical energy, and a communication interface for a communication link to the main robot part.

17. The parking robot of claim 8, wherein a longitudinal extent of the respective sliding rollers of the respective wheel support arms are parallel with the two opposite sides of the main robot part and the secondary robot part when the respective sliding roller are completely folded-in.

18. The method of claim 9, wherein the respective wheel support arms have respective sliding rollers which, in a folded-out position of the respective wheel support arms, are arranged in a longitudinal direction of the respective sliding rollers, parallel to the wheel axles of the transportation vehicle, and wherein a longitudinal extent of the respective sliding rollers of the respective wheel support arms are parallel with the two opposite sides of the main robot part and the secondary robot part when the respective sliding roller are completely folded-in.

19. The parking robot of claim 3, wherein only the main robot part includes the raised partial region, and wherein the raised partial region is arranged on a second side of the main robot part opposite the first side such that the raised partial region does not contact the first side.

20. The method of claim 12, wherein only the main robot part includes the raised partial region, and wherein the raised partial region is arranged on a second side of the main robot part opposite the first side such that the raised partial region does not contact the first side.

* * * * *